B. X. BLAIR.
Spectacles.

No. 207,844.　　　　　　　Patented Sept. 10, 1878.

Attest:

J. C. Blair
E. McCaffrea

Inventor.

Brice. X. Blair

UNITED STATES PATENT OFFICE.

BRICE X. BLAIR, OF HUNTINGDON, PENNSYLVANIA.

IMPROVEMENT IN SPECTACLES.

Specification forming part of Letters Patent No. 207,844, dated September 10, 1878; application filed May 10, 1878.

*To all whom it may concern:*

Be it known that I, BRICE X. BLAIR, of Huntingdon, Pennsylvania, have invented certain new and useful Improvements in Vacuum Eyeglass and Spectacle Holders; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a rubber vacuum-bulb for holding eyeglasses or spectacles in the proper place, as will be hereinafter more fully set forth.

In order to enable others skilled in the art to which my invention appertains to make and use the same, I will now proceed to describe its construction and operation, referring to the annexed drawing, in which—

Figure 1:
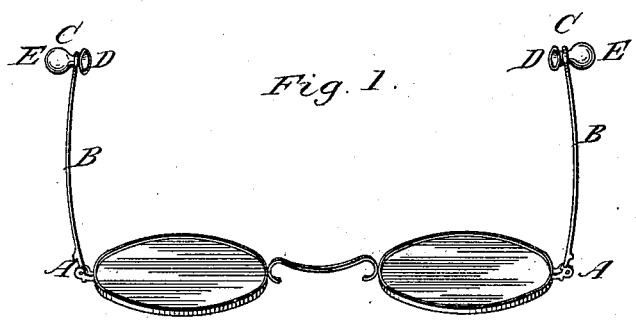
Figure 3:
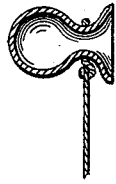
Figure 2:
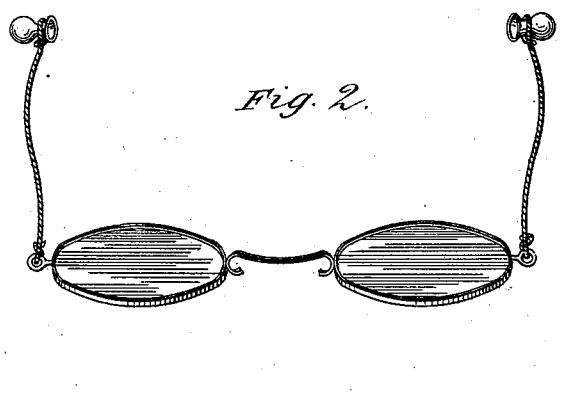

Figure 1 is a horizontal view of my spectacles. Fig. 2 is a view of my eyeglasses. Fig. 3 is a view of my rubber vacuum-bulb.

A A represent the ends of my spectacles, at which points rises a hinged standard, B B. In the end of each there is a round hole or opening, C C, through which the rubber vacuum-bulbs D D are placed, with the flat or concave inside toward the face when put on. E E represent a small rubber vacuum-bulb, round and hollow at one end and concave at the other end, connected by a neck, by which it is held in place, having a small hole through the same into the air-chamber in the bulb.

In using my invention for eyeglasses the standard B can be dispensed with and substitute a fine wire or cord in its stead.

To the proper understanding of this my invention it is only necessary to take the rubber bulb between the thumb and finger, and before adjusting them to the temples to squeeze them so as to exhaust the air, and press them to the skin, when they will adhere, substantially as and for the purposes herein set forth.

I claim—

The vacuum-bulb E, attached to the standard B and adapted to adhere to the face by exhausting the air from said bulb, substantially in the manner and for the purpose set forth.

In testimony that I claim the foregoing as my own I affix my signature in the presence of two witnesses.

BRICE X. BLAIR.

Witnesses:
JOHN W. MATTERN,
J. C. BLAIR.